(12) United States Patent
Matsushita

(10) Patent No.: US 12,359,081 B2
(45) Date of Patent: Jul. 15, 2025

(54) INK, METHOD FOR PRODUCING INK, AND INKJET SYSTEM

(71) Applicant: Yuuki Matsushita, Kanagawa (JP)

(72) Inventor: Yuuki Matsushita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 817 days.

(21) Appl. No.: 17/455,952

(22) Filed: Nov. 22, 2021

(65) Prior Publication Data

US 2022/0169877 A1    Jun. 2, 2022

(30) Foreign Application Priority Data

Nov. 30, 2020  (JP) .................. 2020-198548
Oct. 19, 2021  (JP) .................. 2021-171213

(51) Int. Cl.
  *C09D 11/328*  (2014.01)
  *B41J 2/14*    (2006.01)
  *C09D 11/033*  (2014.01)
  *C09D 11/037*  (2014.01)
  *C09D 11/38*   (2014.01)

(52) U.S. Cl.
  CPC .......... *C09D 11/328* (2013.01); *C09D 11/033* (2013.01); *C09D 11/037* (2013.01); *C09D 11/38* (2013.01); *B41J 2/1433* (2013.01)

(58) Field of Classification Search
  CPC ... C09D 11/328; C09D 11/033; C09D 11/037; C09D 11/38; C09D 11/54; B41J 2/1433; B41J 2/01
  See application file for complete search history.

(56) References Cited

U.S. PATENT DOCUMENTS

| | | | |
|---|---|---|---|
| 4,365,998 A | 12/1982 | Sugiyama et al. | |
| 4,668,235 A * | 5/1987 | Evans | C07D 249/20 8/490 |
| 4,836,852 A | 6/1989 | Knirsch et al. | |
| 6,394,597 B1 * | 5/2002 | Koike | D06P 1/6735 347/106 |
| 2004/0155947 A1 * | 8/2004 | Ozawa | C09D 11/40 347/100 |
| 2007/0221079 A1 | 9/2007 | Aruga et al. | |
| 2008/0254228 A1 | 10/2008 | Kojima et al. | |

(Continued)

FOREIGN PATENT DOCUMENTS

| | | |
|---|---|---|
| CN | 1965038 | 5/2007 |
| CN | 101321630 | 12/2008 |

(Continued)

OTHER PUBLICATIONS

English machine translation of CN 102504648 A, Li L et al, published Jun. 20, 2012. (Year: 2024).*

(Continued)

*Primary Examiner* — Coris Fung
*Assistant Examiner* — Caroline D. Liott
(74) *Attorney, Agent, or Firm* — Grüneberg and Myers PLLC

(57) ABSTRACT

An ink is provided that comprises wafer and a dye having a triazine skeleton. The ink satisfies Expression (1):

$$y \leq -403x + 3400 \quad \text{Expression (1)}$$

where, in Expression (1), x is pH where x is in a range of from 4 through 8.5 ($4 \leq x \leq 8.5$) and y is electric conductivity (mS/cm).

12 Claims, 2 Drawing Sheets

(56) References Cited

U.S. PATENT DOCUMENTS

| | | |
|---|---|---|
| 2009/0033704 A1 | 2/2009 | Mori |
| 2018/0016454 A1 | 1/2018 | Matsushita et al. |
| 2018/0086929 A1 | 3/2018 | Hayashi et al. |
| 2018/0273781 A1 | 9/2018 | Matsushita |
| 2018/0319158 A1 | 11/2018 | Fujii et al. |
| 2019/0284409 A1 | 9/2019 | Matsushita |
| 2020/0231725 A1 | 7/2020 | Matsushita et al. |
| 2020/0231830 A1 | 7/2020 | Kobayashi et al. |
| 2020/0231832 A1 | 7/2020 | Shimizu et al. |
| 2020/0231833 A1 | 7/2020 | Kojima et al. |
| 2023/0323509 A1* | 10/2023 | Wyrsta ............... C22B 3/22 423/158 |

FOREIGN PATENT DOCUMENTS

| | | | |
|---|---|---|---|
| CN | 102504648 | | 6/2012 |
| CN | 104762835 A | * | 7/2015 |
| JP | 63-086768 | | 4/1988 |
| JP | H07-25015 | | 1/1995 |
| JP | 7-102389 | | 4/1995 |
| JP | 2002-371207 | | 12/2002 |
| JP | 2003-72086 | | 3/2003 |
| JP | 2004-269596 | | 9/2004 |
| JP | 2005-047990 | | 2/2005 |
| JP | 2007-056190 | | 3/2007 |
| JP | 2008-95088 | | 4/2008 |
| JP | 2017-071683 | | 4/2017 |
| JP | 2018-053236 | | 4/2018 |
| JP | 2021116310 A | * | 8/2021 |
| WO | WO2017/126611 A1 | | 7/2017 |

OTHER PUBLICATIONS

English machine translation of JP 2021-163310 A, Oki Y, published Aug. 10, 2021. (Year: 2024).*

English machine translation of CN 104762835 A, Liu, published Jul. 8, 2015. (Year: 2024).*

Chinese Office Action received for Chinese Patent Application No. 202111432016.6, issued on Sep. 11, 2023, 4 pages.

Chinese Office Action dated Nov. 1, 2022, in Chinese Application No. 202111432016.6, 9 pages.

* cited by examiner

INK, METHOD FOR PRODUCING INK, AND INKJET SYSTEM

CROSS-REFERENCE TO RELATED APPLICATIONS

This patent application is based on and claims priority pursuant to 35 U.S.C. § 119(a) to Japanese Patent Application No. 2020-198548, filed on Nov. 30, 2020 and Japanese Patent Application No. 2021-171213, filed on Oct. 19, 2021, in the Japan Patent Office, the entire disclosure of each of which is hereby incorporated by reference herein.

BACKGROUND

Technical Field

The present disclosure relates to an ink, a method for producing ink, and an inkjet system.

Description of the Related Art

In the art, screen printing, roller printing, rotary screen printing, gravure printing, and transfer printing using any of the above-listed printing methods have been known as a method for firmly and precisely drawing a pattern on fabric with a dye. In recent years, a system where an image to be printed, such as a pattern, is read by a scanner, and is directly printed on a textile material, such as fabric using a signal of the image processed by a computer (electrophotographic system or inkjet system), and a system where an image, etc. are temporarily printed on transfer paper, and the image, etc. are transferred to a textile material, such as fabric, have been implemented as practical use.

Various coloring materials and solvents are used for inks for printing the above-mentioned textile materials, such as fabric.

SUMMARY

According to one aspect of the present disclosure, an ink is provided. The ink comprises water and a dye having a triazine skeleton. The ink satisfies Expression (1):

$$y \leq -403x + 3400 \quad \text{Expression (1)},$$

where, in Expression (1), x is pH where x is in a range of from 4 through 8.5 ($4 \leq x \leq 8.5$) and y is electric conductivity (mS/cm).

According to one aspect of the present disclosure, a method for producing the above ink is provided. The method includes adding an organic acid to ink raw materials satisfying Expression (2) below to make the ink satisfy Expression (1) below:

$$y \leq -403x + 3400 \quad \text{Expression (1); and}$$

$$y > -403x + 3400 \quad \text{Expression (2)}.$$

In the Expressions (1) and (2), x is pH where x is in the range of from 4 through 8.5 ($4 \leq x \leq 8.5$) and y is electric conductivity (mS/cm). The ink raw materials include the water and the dye having a triazine skeleton.

According to one aspect of the present disclosure, an inkjet system is provided. The inkjet system includes: an ink storing unit storing the above ink; and an inkjet head including a nozzle substrate having an ink repellent layer including a silicone resin. The inkjet head is configured to discharge the ink stored in the ink storing unit.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
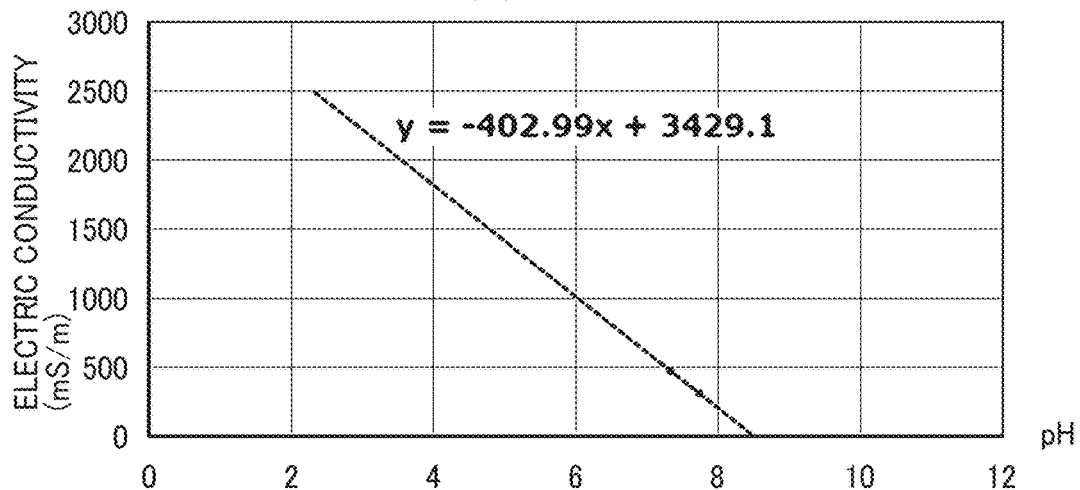
FIG. 1 is a graph explaining a method for deriving Expressions (1) to (4)

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The present disclosure can provide a dye ink that does not degrade an ink repellent layer on a nozzle substrate made of SUS and does not lower ink repellency of the nozzle substrate made of SUS, even when the ink is in contact with the nozzle substrate made of SUS having the ink repellent layer including a silicone resin for a long period of time.

(Ink and Method for Producing Ink)

<Ink>

According one aspect of the present disclosure, an ink includes water, and a dye having a triazine skeleton, and the ink satisfies Expression (1) below.

$$y \leq -403x + 3400 \quad \text{Expression (1)}$$

In the Expression (1), x is pH where x is in the range of from 4 through 8.5 ($4 \leq x \leq 8.5$) and y is electric conductivity (mS/cm).

According to another aspect of the present disclosure, an ink includes water, and a dye having a triazine skeleton, and the ink satisfies Expression (3) below.

$$y \leq -402.99x + 3429.1 \quad \text{Expression (3)}$$

In the Expression (3), x is pH where x is in the range of from 4 through 8.5 ($4 \leq x \leq 8.5$) and y is electric conductivity (mS/cm).

Moreover, the ink of the present disclosure may further include other components according to the necessity.

<Method for Producing Ink>

The method for producing ink of the present disclosure includes a step of adding an organic acid to ink raw materials, where the ink raw materials include water and a dye having a triazine skeleton. The method for producing ink may further include other steps according to the necessity.

The step of adding the organic acid to the ink raw materials has a first aspect, a second aspect, and a third aspect, all of which can exert the effect of the present disclosure.

According to the first aspect, a method for producing ink includes adding an organic acid to ink raw materials satisfying Expression (2) below to make the ink satisfy Expression (1) below, where the ink raw materials include water and a dye having a triazine skeleton.

$$y \leq -403x + 3400 \quad \text{Expression (1)}$$

$$y > -403x + 3400 \quad \text{Expression (2)}$$

In Expressions (1) and (2), x is pH where x is in the range of from 4 through 8.5 ($4 \leq x \leq 8.5$) and y is electric conductivity (mS/cm). The method for producing ink may further include other steps according to the necessity.

According to the second aspect, a method fix producing ink includes adding an organic acid to ink raw materials satisfying Expression (4) below to make the ink satisfy Expression (3) below, where the ink raw materials include water and a dye having a triazine skeleton.

$$y \leq -402.99x + 3429.1 \quad \text{Expression (3)}$$

$$y > -402.99x + 3429.1 \quad \text{Expression (4)}$$

In Expressions (3) and (4), x is pH where x is in the range of from 4 through 8.5 ($4 \leq x \leq 8.5$) and y is electric conductivity (mS/cm). The method for producing ink may further include other steps according to the necessity.

According to the third aspect, a method for producing ink includes adding 5 parts by mass or greater but 20 parts by mass or less of an organic acid to 100 parts by mass of ink raw materials including water and a dye having a triazine skeleton. The method for producing ink may further include other steps.

Moreover, the ink raw materials used in the method for producing ink of the present disclosure and the ink produced by the method may further include other components according to the necessity.

<Method for Deriving Expressions (1) to (4)>

The linear functions corresponding to the Expressions (1) to (4) are derived as follows.

<<Preparation of Ink Raw Materials>>

A container is charged with the following materials to have the composition presented in Table 1, and the resultant mixture is stirred for 2 hours, followed by filtering the mixture with a membrane filter having a pore diameter of 0.45 μm, to thereby obtain each of Ink Raw Materials 1 and 2.

Glycerin (obtained from FUJIFILM Wako Pure Chemical Corporation)
2-Pyrrolidone (obtained from Mitsubishi Chemical Corporation)
Dipropylene glycol (obtained from SUMITOMO CHEMICAL COMPANY, LIMITED)
Propylene glycol (obtained from FUJIFILM Wako Pure Chemical Corporation)
Reactive Orange 13
Reactive Red 24
Water (ion-exchanged water)

TABLE 1

| Ink Raw Materials No. | Glycerin (mass %) | 2-pyrrolidone (mass %) | Dipropylene glycol (mass %) | Propylene glycol (mass %) | Dye | Amount (mass %) | Water (mass %) |
|---|---|---|---|---|---|---|---|
| 1 | 1.0 | 8.0 | 37.0 | 0.0 | Reactive Orange 13 | 10.0 | 44.0 |
| 2 | 1.0 | 9.0 | 0.0 | 27.0 | Reactive Orange 24 | 10.0 | 53.0 |

After measuring pH and electric conductivity of each of Ink Raw Materials 1 and 2 obtained, wettability on an ink repellent layer is evaluated. The measurement results are presented in Table 2.

The pH is measured by maintaining the temperature of each ink raw material at 25° C., and measuring the ink raw material by means of a multi-function water quality meter (obtained from DKK-TOA CORPORATION).

The electric conductivity is measured by means of a multi-function water quality meter (obtained from DKK-TOA CORPORATION).

<Evaluation of Wettability on Ink Repellent Layer Including Silicone Resin>

A contact angle of water on an ink repellent layer of a nozzle substrate is measured before immersing the nozzle substrate in each ink raw materials, where the ink repellent layer includes a silicone resin. As an inkjet head having the nozzle substrate having the ink repellent layer including the silicone resin, an MH5320 head (obtained from Ricoh Company Limited) is used. Thereafter, the inkjet head is charged with each of Ink Raw Materials 1 and 2, and the inkjet head including the nozzle surface is immersed in the ink raw materials and stored for 43 days at 50° C. After that, a contact angle of water on the ink repellent layer of the nozzle substrate is measured. The measured values of the contact angle are presented in Table 2.

The contact angle before immersing the nozzle substrate in the ink raw materials is determined as 100%, and the wettability is evaluated based on the following evaluation criteria. The results of B, A, AA, and AAA are determined as a practically usable level.

[Evaluation Criteria of Wettability of Ink Repellent Layer]

AAA: Contact angle after the immersion is 97.5% or greater.

AA: Contact angle after the immersion is 95% or greater but less than 97.5%.

A: Contact angle after the immersion is 87% or greater but less than 95%.

B: Contact angle after the immersion is 60% or greater but less than 87%.
C: Contact angle after the immersion is less than 60%.

TABLE 2

| Ink No. | pH | Electric conductivity (mS/m) | Contact angle (degrees) |
|---|---|---|---|
| 1 | 7.735 | 312 | 63.0 |
| 2 | 7.333 | 474 | 70.0 |

The pH and electric conductivity of each of Ink Raw Materials 1 and 2 are plotted as x (4≤x≤8.5) and y (mS/m), respectively, as in FIG. 1. The approximate straight line is drawn from the two plots, from which the linear function "y=−402.99x+3429.1" is derived. The right side of the derived linear function is rounded off to derive "y=−403x+3400."

The relationship between the physical properties, i.e., the pH and the electric conductivity, indicated by the linear function, and the degree of degradation of the ink repellent layer including a silicone resin has been studied.

As a result, it is assumed that the pH and the electric conductivity indicated by the linear function are correlated with the property of the ink repellent layer including a silicone resin in the present disclosure. Specifically, the silicone resin included in the ink repellent layer may be dissolved and degraded when the pH and the electric conductivity are high.

Whether the effect of the present disclosure can be exerted is verified by varying the electric conductivity and the pH using an organic acid.

There are four patterns where the following Expressions (1) and/or (2) obtained from the linear function are satisfied by the addition of an organic acid to the ink raw materials. Which pattern can exert the effect of the present disclosure has been verified.

$$y \leq -403x+3400 \quad \text{Expression (1)}$$

$$y > -403x+3400 \quad \text{Expression (2)}$$

(Pattern 1): Ink obtained by adding an organic acid to ink raw materials satisfying the Expression (2) to make the ink satisfy the Expression (1).
(Pattern 2): Ink satisfying the Expression (2) even after adding an organic acid to ink raw materials satisfying the Expression (2).
(Pattern 3): Ink satisfying the Expression (1) even after adding an organic acid to ink raw materials satisfying the Expression (1).
(Pattern 4): Ink obtained by adding an organic acid to ink raw materials satisfying the Expression (1) to make the ink satisfy the Expression (2).

Moreover, there are four patterns where the following Expressions (3) and/or (4) obtained from the linear function are satisfied by the addition of organic acid to the ink raw materials. Which pattern can exert the effect of the present disclosure has been verified.

$$y \leq -402.99x+3429.1 \quad \text{Expression (3)}$$

$$y > -402.99x+3429.1 \quad \text{Expression (4)}$$

(Pattern 5): Ink obtained by adding an organic acid to ink raw materials satisfying the Expression (4) to make the ink satisfy the Expression (3).
(Pattern 6): Ink satisfying the Expression (4) even after adding an organic acid to ink raw materials satisfying the Expression (4).
(Pattern 7): Ink satisfying the Expression (3) even after adding an organic acid to ink raw materials satisfying the Expression (3).
(Pattern 8): Ink obtained by adding an organic acid to ink raw materials satisfying the Expression (3) to make the ink satisfy the Expression (4).

As a more specific verification method, the verification is performed by adding 10 parts by mass of acetic acid to 100 parts by mass of each of inks of Examples 1 and 5 of Japanese Patent (JP-B) No. 2519744 (corresponding to U.S. Pat. No. 4,836,852, the disclosure of which is incorporated herein by reference) or Example 1 of Japanese Unexamined Patent Application Publication (JP-A) No. 2007-056190.

The pH, electric conductivity, and contact angle of each ink are measured in the same manner as in the above-described measurement methods for Ink Raw Materials 1 and 2. The results are presented in Table 3.

TABLE 3

| Literature | Ink No. | pH | Electric conductivity (mS/m) | Contact angle (degrees) | Pattern | |
|---|---|---|---|---|---|---|
| JP-B No. 2519744 | Ex. 1 | 1 | 6.3 | 810.0 | 63 | 1 | 5 |
| | Ex. 5 | 5 | 8.0 | 750.0 | 45 | 2 | 6 |
| JP-A No. 2007-05690 | Ex. 1 | 6 | 5.0 | 60.0 | 95 | 3 | 7 |

Each of the inks obtained according to (Pattern 1) to (Pattern 4) and (Pattern 5) to (Pattern 8) is subjected to an evaluation of wettability on a nozzle substrate that includes an ink repellent layer including a silicone resin.

<<Evaluation of Wettability on Ink Repellent Layer Including Silicone Resin>>

A contact angle of water on an ink repellent layer of a nozzle substrate is measured before immersing the nozzle substrate in each of the inks obtained according to (Pattern 1) to (Pattern 4) and (Pattern 5) to (Pattern 8), where the ink repellent layer includes a silicone resin. As an inkjet head having the nozzle substrate that includes the ink repellent layer including the silicone resin, an MH5320 head (obtained from Ricoh Company Limited) is used. Thereafter, the inkjet head is charged with the ink, and the inkjet head including the nozzle surface is immersed in the ink and stored for 4 weeks at 50° C. After that, a contact angle of water on the ink repellent layer of the nozzle substrate is measured. The contact angle before immersing the nozzle substrate in the ink is determined as 100%, and the wettability is evaluated.

Figure 2:
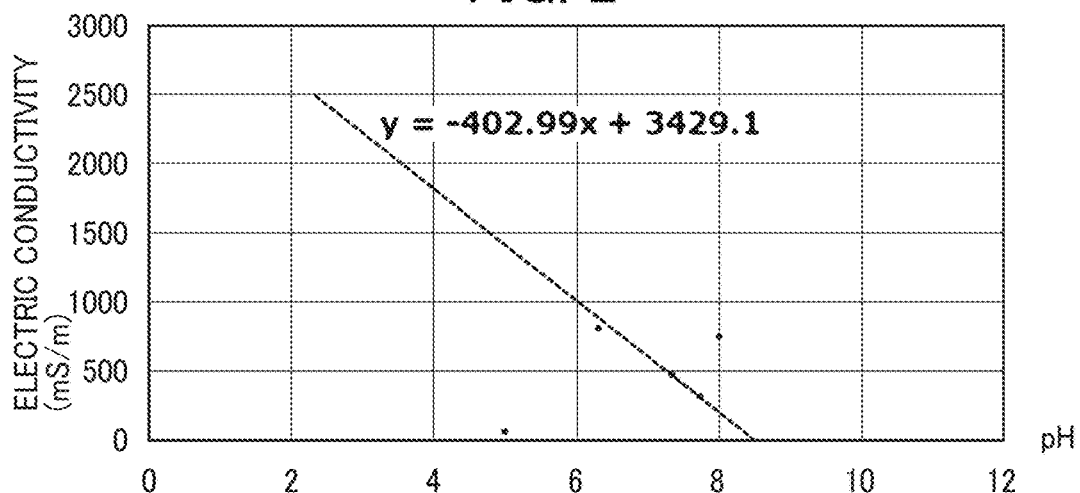
FIG. 2 is a graph explaining a method for deriving Expressions (1) to (4)

The relationship between the pH and electric conductivity of the inks obtained according to (Pattern 1) to (Pattern 4) is depicted in FIG. 2.

Among the 4 patterns for which the above-verification is performed, only the ink of (Pattern 1) achieves excellent wettability on the nozzle substrate having the ink repellent layer. The ink of (Pattern 1) does not degrade the ink repellent layer on the nozzle substrate and does not degrade ink repellency of the nozzle substrate even when the ink is in contact with the nozzle substrate having the ink repellent layer including a silicone resin for a long period of time.

Both the inks of (Pattern 2) and (Pattern 3) do not achieve excellent wettability on the nozzle substrate having the ink repellent layer.

Moreover, the ink satisfying (Pattern 4) cannot be obtained.

Moreover, only the ink of (Pattern 5) has excellent wettability on the nozzle substrate having the ink repellent layer, and does not degrade the ink repellent layer of the nozzle substrate, and does not degrade ink repellency of the nozzle substrate even when the ink is in contact with the nozzle substrate having the ink repellent layer including the silicone resin for a long period.

Both the inks of (Pattern 6) and (Pattern 7) do not achieve excellent wettability on the nozzle substrate having the ink repellent layer.

Moreover, the ink satisfying (Pattern 8) cannot be obtained.

It is assumed that the results above indicate that degradation of the ink repellent layer can be prevented by lowering pH of the ink to shift it to the acidic side, as the silicone resin included in the ink repellent layer is dissolved with alkali.

Figure 3:
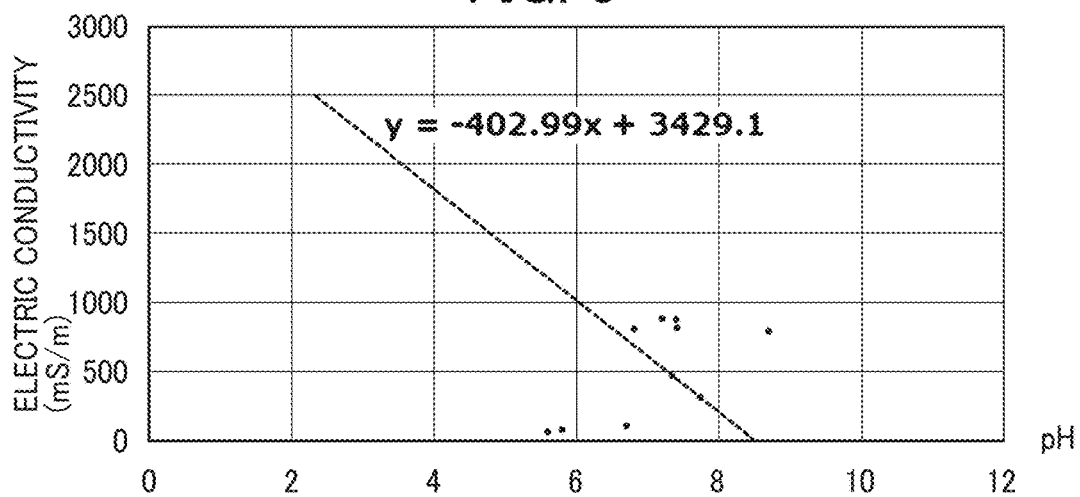
FIG. 3 is a graph explaining Expressions (1) to (4)

In order to verily the above-obtained four linear function expressions, the following inks are subjected to measurements of pH, electric conductivity, and wettability on the ink repellent layer in the same manner as the methods used for Ink Raw Materials 1 and 2. The results are presented in Table 4. For the inks, inks of Examples 1 to 5 of Japanese Patent (JP-B) No. 2519744 (corresponding to U.S. Pat. No. 4,836,852, the disclosure of which is incorporated herein by reference), and Examples 1 and 2 and Comparative Example 3 of Japanese Unexamined Patenttent Application Publication (JP-A) No. 2007-056190 are used. A relationship between pH and electric conductivity of the above-mentioned 8 inks is depicted in FIG. 3.

TABLE 4

| Literature | Ink No. | | pH | Electric conductivity (mS/m) | Contact angle (degrees) | Evaluation |
|---|---|---|---|---|---|---|
| JP-B No. 2519744 | Ex. 1 | 1 | 7.4 | 819.9 | 55 | C |
| | Ex. 2 | 2 | 7.4 | 877.2 | 50 | C |
| | Ex. 3 | 3 | 7.2 | 880.3 | 49 | C |
| | Ex. 4 | 4 | 6.8 | 809.7 | 58 | C |
| | Ex. 5 | 5 | 8.7 | 790.5 | 59 | C |
| JPA No. 2007-056190 | Ex. 1 | 6 | 5.6 | 66.0 | 95 | B |
| | Ex. 2 | 7 | 5.8 | 76.0 | 90 | B |
| | Comp. Ex. 3 | 8 | 6.7 | 102.0 | 85 | B |

The inks of Examples 1 to 5 of Japanese Patent (JP-B) No. 2519744 are the same as those described in U.S. Pat. No. 4,836,852.

The inks of Examples 1 and 2 and Comparative Example 3 of Japanese Unexamined Patent Application Publication (JP-A) No. 2007-056190 are prepared as follows. Raw materials listed in the following Table 4-2 are mixed and dissolved, followed by filtration with a 0.8-μm membrane filter, to obtain each ink. The 99-degree fermented alcohol used here is ethanol having a concentration of 99% or more.

TABLE 4-2

| | JP-A No. 2007-056190 | | |
|---|---|---|---|
| | Example 1 | Example 2 | Comparative Example 3 |
| Monascus color ethanol extract (i.e., color solution of 100 parts by weight of powdery Monascus color extracted by water/ethanol mixed solvent further extracted by 700 parts by weight of 99-degree fermented ethanol, having a color content of 3.0%) | 72 | 72 | 0 |
| Monascus powdery color (i.e., powdery Monascus color extracted by water/ethanol mixed solvent) | | | 3 |
| Shellac alcohol solution (50 wt %) | 11 | 11 | 0 |
| Water-soluble shellac solution (i.e., water-soluble shellac 50 wt %, alcohol 25 wt %, water 25 wt %) | | | 11 |
| Propylene glycol | 0.5 | 2 | 2 |
| Sodium lactate/Lactic acid/Water (in weight ratio of 1/1/1) | 4.2 | 4.2 | |
| Sodium lactate 50 wt % aqueous solution | | | 4.2 |
| Purified water | 3 | 3 | 3 |
| 99-Degree fermented ethanol | balance | balance | balance |

The inks satisfying the ranges of "y≤−402.99x+3429.1" and "y≤−403x+3400," are all evaluated as B or better, and the inks satisfying the ranges of "y>−402.99x+3429.1" and "y>−403x+3400" are all evaluated as C, and therefore the evaluation results of the wettability on the ink repellent layer can be divided based on the above-obtained linear function expressions "y=−402.99x+3429.1" and "y=−403x+3400".

The present inventors have found, in the first aspect, that the effect of the present disclosure can be exerted by producing an ink by the ink production method, which includes adding an organic acid to ink raw materials satisfying Expression (2) below to make the ink satisfy Expression (1) below, where the ink raw materials include water and a dye having a triazine skeleton.

$$y \leq -403x+3400 \qquad \text{Expression (1)}$$

$$y > -403x+3400 \qquad \text{Expression (2)}$$

In Expressions (1) and (2), x is pH where x is in the range of from 4 through 8.5 (4≤x≤8.5) and y is electric conductivity (mS/cm).

The present inventors have found, in the second aspect, that the effect of the present disclosure can be exerted by producing an ink by the ink production method, which includes adding an organic acid to ink raw materials satisfying Expression (4) below to make the ink satisfy Expression (3) below, where the ink raw materials include water and a dye having a triazine skeleton.

$$y \leq -402.99x+3429.1 \qquad \text{Expression (3)}$$

$$y > -402.99x+3429.1 \qquad \text{Expression (4)}$$

In Expressions (3) and (4), x is pH where x is in the range of from 4 through 8.5 (4≤x≤8.5) and y is electric conductivity (mS/cm).

The ink raw materials used to derive the linear functions corresponding to Expressions (1) to (4) of the present disclosure are obtained by adding an organic solvent etc. to a standard ink that is used as a standard product.

The standard ink, which is an already existing ink, cannot exert the effect of the present disclosure. The effect of the present disclosure can be exerted by adding an organic solvent etc. and adjusting the pH to such a standard ink.

The conventional inks known in the art have a drawback that the inks gradually react with an ink repellent layer including a silicone resin to degrade the ink repellent layer when the inks are stored inside an inkjet head for a long period. Moreover, it has been known that the reaction with the ink repellent layer is accelerated and the ink repellent layer tends to be degraded more easily, when pH or electric conductivity of the inks known in the art is high. When the ink repellent performance on the nozzle substrate is impaired due to degradation of the ink repellent layer, deposition of the ink on edges of nozzle holes cannot be sufficiently prevented, discharge stability may be low, nozzle may be clogged with the ink, and the abnormal jet direction of the ink may be caused at the time of ejection.

As a result of the study diligently conducted by the inventors of the present invention, the inventors have found that the dissolution of the silicone resin included in the ink repellent layer disposed on the nozzle substrate can be reduced and degradation of the ink repellent layer can be prevented by using the above-described ink and the above-described method for producing ink.

As a result of the study diligently conducted by the inventors of the present invention, moreover, the inventors have found that the above-described ink and an ink obtained by the above-described method for producing ink do not cause corrosion of a metal nor elution thereof even when the ink is in contact with a nozzle substrate made of SUS (stainless use steel) for a long period, and therefore degradation of the nozzle substrate made of SUS can be prevented.

Accordingly, a dye ink that does not degrade an ink repellent layer on a nozzle substrate made of SUS and does not lower ink repellency of the nozzle substrate made of SUS, even when the ink is in contact with the nozzle substrate made of SUS having the ink repellent layer including a silicone resin for a long period of time, can be obtained, when the ink is:

- an ink produced by an ink production method including adding an organic acid to ink raw materials satisfying Expression (2) to make the ink satisfy Expression (1), where the ink raw materials include water and a dye having a triazine skeleton;
- an ink produced by an ink production method including adding an organic acid to ink raw materials satisfying Expression (4) to make the ink satisfy Expression (3), where the ink raw materials include water and a dye having a triazine skeleton;
- an ink obtained by an ink production method including adding 5 parts by mass or greater but 20 parts by mass or less of an organic acid to 100 parts by mass of ink raw materials, where the ink raw materials include water and a dye having a triazine skeleton;
- an ink including water and a dye having a triazine skeleton, and satisfying Expression (1); or
- an ink including water and a dye having a triazine skeleton, and satisfying Expression (3)

$$y \leq -403x+3400 \qquad \text{Expression (1)}$$

$$y > -403x+3400 \qquad \text{Expression (2)}$$

$$y \leq -402.99x+3429.1 \qquad \text{Expression (3)}$$

$$y > -402.99x+3429.1 \qquad \text{Expression (4)}$$

In Expressions (1) to (4), x is pH where x is in the range of from 4 through 8.5 (4≤x≤8.5) and y is electric conductivity (mS/cm).

<Dye Having Triazine Skeleton>

In the ink and method for producing ink of the present disclosure, the dye having a triazine skeleton is not particularly limited as long as the dye is a reactive dye, and may be appropriately selected depending on the intended purpose. Examples thereof include, but are not limited to, C.I. Reactive Black 1. C.I. Reactive Black 3, C.I. Reactive Black 8, C.I. Reactive Black 10, C.I. Reactive Black 12, C.I. Reactive Black 13, C.I. Reactive Black 39, C.I. Reactive Blue 2, C.I. Reactive Blue 3, C.I. Reactive Blue 5, C.I. Reactive Blue 7, C.I. Reactive Blue 13, C.I. Reactive Blue 14, C.I. Reactive Blue 15, C.I. Reactive Blue 25, C.I. Reactive Blue 26, C.I. Reactive Blue 39, C.I. Reactive Blue 40, Reactive Blue 49, C.I. Reactive Red 3, C.I. Reactive Red 4, C.I. Reactive Red 7, C.I. Reactive Red 15, C.I. Reactive Red 16, C.I. Reactive Red 24, C.I. Reactive Red 29, C.I. Reactive Red 31, C.I. Reactive Red 32, C.I. Reactive Red 33, C.I. Reactive Red 43, C.I. Reactive Red 45, C.I. Reactive Red 46, C.I. Reactive Red 58, C.I. Reactive Red 59, C.I. Reactive Red 256, C.I. Reactive Red 245, C.I. Reactive Yellow 3, C.I. Reactive Yellow 6, C.I. Reactive Yellow 12, C.I. Reactive Yellow 18, C.I. Reactive Yellow 95, C.I. Reactive Yellow 99, C.I. Reactive Orange 2, C.I. Reactive Orange 5, C.I. Reactive Orange 9, C.I. Reactive Orange 12, C.I. Reactive Orange 13, C.I. Reactive Orange 39, C.I. Reactive Green 5, C.I. Reactive Green 8, C.I. Reactive Violet 1, and C.I. Reactive Violet 2.

These may be used alone or in combination.

A dye that can be used in combination with the dye having a triazine skeleton is not particularly limited, and array be appropriately selected depending on the intended purpose. Examples thereof include, but are not limited to, acid dyes, direct dyes, basic dyes, and second reactive dyes other than the reactive dye ("first reactive dye"). Part of food dyes may be included in the acid dyes.

These may be used alone or in combination.

Examples of the acid dyes include, but are not limited to, C.I. Acid Yellow 17, C.I. Acid Yellow 23, C.I. Acid Yellow 42, C.I. Acid Yellow 44, C.I. Acid Yellow 79, C.I. Acid Yellow 142, C.I. Acid Red 1, C.I. Acid Red 8, C.I. Acid Red 13, C.I. Acid Red 14, C.I. Acid Red 18, C.I. Acid Red 26, C.I. Acid Red 27, C.I. Acid Red 35, C.I. Acid Red 37, C.I. Acid Red 42, C.I. Acid Red 52, C.I. Acid Red 82, C.I. Acid Red 87, C.I. Acid Red 89, C.I. Acid Red 92, C.I. Acid Red 97, C.I. Acid Red 106, C.I. Acid Red 111, C.I. Acid Red 114, C.I. Acid Red 115, C.I. Acid Red 134, C.I. Acid Red 186, C.I. Acid Red 249, C.I. Acid Red 254, C.I. Acid Red 289, C.I. Acid Blue 9, C.I. Acid Blue 29, C.I. Acid Blue 45, C.I. Acid Blue 92, C.I. Acid Blue 249, C.I. Acid Black 1, C.I. Acid Black 2, C.I. Acid Black 7, C.I. Acid Black 24, C.I. Acid Black 26, and C.I. Acid Black 94.

Examples of the food dyes include, but are not limited to, C.I. Food Yellow 3, C.I. Food Red 14, C.I. Food Black 1, and C.I. Food Black 2.

Examples of the direct dyes include, but are not limited to, C.I. Direct Yellow 1, C.I. Direct Yellow 12, C.I. Direct Yellow 24, C.I. Direct Yellow 26, C.I. Direct Yellow 33, C.I. Direct Yellow 44, C.I. Direct Yellow 50, C.I. Direct Yellow 86, C.I. Direct Yellow 120, C.I. Direct Yellow 132, C.I. Direct Yellow 142, C.I. Direct Yellow 144, C.I. Direct Red 1, C.I. Direct Red 4, C.I. Direct Red 9, C.I. Direct Red 13, C.I. Direct Red 17, C.I. Direct Red 20, C.I. Direct Red 28, C.I. Direct Red 31, C.I. Direct Red 39, C.I. Direct Red 80, C.I. Direct Red 81, C.I. Direct Red 83, C.I. Direct Red 89, C.I. Direct Red 225, C.I. Direct Red 227, C.I. Direct Orange 26, C.I. Direct Orange 29, C.I. Direct Orange 62, C.I. Direct Orange 102, C.I. Direct Blue 1, C.I. Direct Blue 2, C.I. Direct Blue 6, C.I. Direct Blue 15, C.I. Direct Blue 22, C.I. Direct Blue 25, C.I. Direct Blue 71, C.I. Direct Blue 76, C.I. Direct Blue 79, C.I. Direct Blue 86, C.I. Direct Blue 87, C.I. Direct Blue 90, C.I. Direct Blue 98, C.I. Direct Blue 163, C.I. Direct Blue 165, C.I. Direct Blue 199, C.I. Direct Blue 202, C.I. Direct Black 19, C.I. Direct Black 22, C.I. Direct Black 32, C.I. Direct Black 38, C.I. Direct Black 51, C.I. Direct Black 56, C.I. Direct Black 71, C.I. Direct Black 74, C.I. Direct Black 75, C.I. Direct Black 77, C.I. Direct Black 154, C.I. Direct Black 168, and C.I. Direct Black 171.

Examples of the basic dyes include, but are not limited to, C.I. Basic Yellow 1, C.I. Basic Yellow 2, C.I. Basic Yellow 11, C.I. Basic Yellow 13, C.I. Basic Yellow 14, C.I. Basic Yellow 15, C.I. Basic Yellow 19, C.I. Basic Yellow 21, C.I. Basic Yellow 23, C.I. Basic Yellow 24, C.I. Basic Yellow 25, C.I. Basic Yellow 28, C.I. Basic Yellow 29, C.I. Basic Yellow 32, C.I. Basic Yellow 36, C.I. Basic Yellow 40, C.I. Basic Yellow 41, C.I. Basic Yellow 45, C.I. Basic Yellow 49, C.I. Basic Yellow 51, C.I. Basic Yellow 53, C.I. Basic Yellow 63, C.I. Basic Yellow 64, C.I. Basic Yellow 65, C.I. Basic Yellow 67, C.I. Basic Yellow 70, C.I. Basic Yellow 73, C.I. Basic Yellow 77, C.I. Basic Yellow 87, C.I. Basic Yellow 91, C.I. Basic Red 2, C.I. Basic Red 12, C.I. Basic Red 13, C.I. Basic Red 14, C.I. Basic Red 15, C.I. Basic Red 18, C.I. Basic Red 22, C.I. Basic Red 23, C.I. Basic Red 24, C.I. Basic Red 27, C.I. Basic Red 29, C.I. Basic Red 35, C.I. Basic Red 36, C.I. Basic Red 38, C.I. Basic Red 39, C.I. Basic Red 46, C.I. Basic Red 49, C.I. Basic Red 51, C.I. Basic Red 52, C.I. Basic Red 54, C.I. Basic Red 59, C.I. Basic Red 68, C.I. Basic Red 69, C.I. Basic Red 70, C.I. Basic Red 73, C.I. Basic Red 78, C.I. Basic Red 82, C.I. Basic Red 102, C.I. Basic Red 104, C.I. Basic Red 109, C.I. Basic Red 112, C.I. Basic Blue 1. C.I. Basic Blue 3, C.I. Basic Blue 5, C.I. Basic Blue 7, C.I. Basic Blue 9, C.I. Basic Blue 21, C.I. Basic Blue 22, C.I. Basic Blue 26, C.I. Basic Blue 35, C.I. Basic Blue 41, C.I. Basic Blue 45, C.I. Basic Blue 47, C.I. Basic Blue 54, C.I. Basic Blue 62, C.I. Basic Blue 65, C.I. Basic Blue 66, C.I. Basic Blue 67, C.I. Basic Blue 69, C.I. Basic Blue 75, C.I. Basic Blue 77, C.I. Basic Blue 78, C.I. Basic Blue 89, C.I. Basic Blue 92, C.I. Basic Blue 93, C.I. Basic Blue 105, C.I. Basic Blue 117, C.I. Basic Blue 120, C.I. Basic Blue 122, C.I. Basic Blue 124, C.I. Basic Blue 129, C.I. Basic Blue 137, C.I. Basic Blue 141, C.I. Basic Blue 147, C.I. Basic Blue 155, C.I. Basic Black 2, and C.I. Basic Black 8.

Examples of the second reactive dyes include, but are not limited to, C.I. Reactive Black 4, C.I. Reactive Black 7, C.I. Reactive Black 11, C.I. Reactive Black 17, C.I. Reactive Yellow 1, C.I. Reactive Yellow 5, C.I. Reactive Yellow 11, C.I. Reactive Yellow 13, C.I. Reactive Yellow 14, C.I. Reactive Yellow 20, C.I. Reactive Yellow 21, C.I. Reactive Yellow 22, C.I. Reactive Yellow 25, C.I. Reactive Yellow 40, C.I. Reactive Yellow 47, C.I. Reactive Yellow 51, C.I. Reactive Yellow 55, C.I. Reactive Yellow 65, C.I. Reactive Yellow 67, C.I. Reactive Red 1, C.I. Reactive Red 14, C.I. Reactive Red 17, C.I. Reactive Red 25, C.I. Reactive Red 26, C.I. Reactive Red 37, C.I. Reactive Red 44, C.I. Reactive Red 55, C.I. Reactive Red 60, C.I. Reactive Red 66, C.I. Reactive Red 74, C.I. Reactive Red 79, C.I. Reactive Red 96, C.I. Reactive Red 97, C.I. Reactive Blue 23, C.I. Reactive Blue 32, C.I. Reactive Blue 35, C.I. Reactive Blue 38, C.I. Reactive Blue 41, C.I. Reactive Blue 63, C.I. Reactive Blue 80, and C.I. Reactive Blue 95.

The proportion of the dye having a triazine skeleton in the ink of the present disclosure is not particularly limited and may be appropriately selected depending on the intended purpose. Considering improvement in image density, and excellent fixability and discharge stability, the proportion thereof in the ink is preferably 0.1% by mass or greater but 15% by mass or less, and more preferably 1% by mass or greater but 10% by mass or less.

The proportion of the dye having a triazine skeleton in the ink produced by the method for producing ink of the present disclosure is not particularly limited and may be appropriately selected depending on the intended purpose. Considering improvement in image density and excellent fixability and discharge stability, the proportion thereof in the ink is preferably 0.1% by mass or greater but 15% by mass or less, and more preferably 1% by mass or greater but 10% by mass or less.

<Organic Acid>

In the ink and method for producing ink of the present disclosure, the organic acid is not particularly limited and may be appropriately selected depending on the intended purpose. Examples thereof include, but are not limited to, acetic acid, formic acid, malonic acid, citric acid, isocitric acid, oxalic acid, maleic acid, fumaric acid, malonic acid, succinic acid, glutaric acid, adipic acid, phthalic acid, isophthalic acid, terephthalic acid, citric acid, benzoic acid, benzoic acid derivatives, salicylic acid, ascorbic acid, malic acid, benzene sulfonic acid, benzene sulfonic acid derivatives, pyruvic acid, and oxaloacetic acid. Of these, acetic acid, formic acid, and malonic acid are preferable.

The pKa of the organic acid is not particularly limited and may be appropriately selected depending on the intended purpose. Considering excellent wettability on an ink repellent layer, the pKa thereof is preferably 4.5 or less and more preferably 3.0 or less.

A measurement method of the pKa of the organic acid is not particularly limited and may be appropriately selected depending on the intended purpose. Examples thereof include, but are not limited to, a titration method.

The amount of the organic acid in the ink of the present disclosure is not particularly limited and may be appropriately selected depending on the intended purpose. Considering excellent wettability on a nozzle substrate made of SUS having an ink repellent layer including a silicone resin, the amount thereof is preferably 5 parts by mass or greater but 20 parts by mass or less, and more preferably 5 parts by mass or greater but 10 parts by mass or less, relative to 100 parts by mass of the ink.

The amount of the organic acid being 5 parts by mass or greater but 20 parts by mass or less relative to 100 parts by mass of the ink is preferable because excellent wettability on SUS, which does not favor acidic conditions, is obtained.

The amount of the organic acid added in the method for producing ink of the present disclosure is not particularly limited and may be appropriately selected depending on the intended purpose. Considering excellent wettability on a nozzle substrate made of SUS having an ink repellent layer including a silicone resin, the amount thereof is preferably 5 parts by mass or greater but 20 parts by mass and more preferably 5 parts by mass or greater but 10 parts by mass or less relative to 100 parts by mass of the ink.

The amount of the organic acid being 5 parts by mass or greater but 20 parts by mass or less relative to 100 parts by mass of the ink is preferable because excellent wettability on SUS, which does not favor acidic conditions, is obtained.

<Water>

In the ink and method for producing ink of the present disclosure, the water is not particularly limited and may be appropriately selected depending on the intended purpose. Examples of the water include, but are not limited to, pure water, such as ion-exchanged water, ultrafiltered water, reverse osmosis water, and distilled water, and ultrapure water.

The proportion of the water in the ink of the present disclosure is not particularly limited and may be appropriately selected depending on the intended purpose. Considering drying and discharge reliability of the ink, the proportion of the water in the ink is preferably 10% by mass or greater but 90% by mass or less, and more preferably 20% by mass or greater but 60% by mass or less.

The proportion of the water in the ink produced by the method for producing ink of the present disclosure is not particularly limited and may be appropriately selected depending on the intended purpose. Considering drying and discharge reliability of the ink, the proportion of the water in the ink is preferably 10% by mass or greater but 90% by mass or less, and more preferably 20% by mass or greater but 60% by mass or less.

<Other Components>

Other components used in the ink and method for producing ink of the present disclosure are not particularly limited and may be appropriately selected depending on the intended purpose. Examples thereof include an organic solvent, a resin, alkaline earth metal ions, and additives.

—Organic Solvent—

The organic solvent is not particularly limited as long as the organic solvent is a water-soluble organic solvent, and may be appropriately selected depending on the intended purpose. Examples of the organic solvent include, but are not limited to: polyvalent alcohols; ethers, such as polyvalent alcohol alkyl ethers and polyvalent alcohol aryl ethers; nitrogen-containing heterocyclic compounds; amides; amines; and sulfur-containing compounds. These may be used alone or in combination.

Specific examples of the organic solvent include, but are not limited to: polyvalent alcohols, such as ethylene glycol, diethylene glycol, 1,3-propanediol, 1,2-butanediol, 1,3-butanediol, 1,4-butanediol, 2,3-butanediol, 3-methyl-1,3-butanediol, triethylene glycol, polyethylene glycol, propylene glycol, dipropylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methylpentane-1,3,5-triol; polyvalent alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers, such as ethylene glycol monophenyl ether, and ethylene glycol monobenzyl ether; nitrogen-containing heterocyclic compounds, such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides, such as formamide, N-methylformamide, N,N-dimethylformamide, 3-methoxy-N,N-dimethylpropionamide, and 3-butoxy-N,N-dimethylpropionamide; amines, such as monoethanolamine, diethanolamine, and triethylamine; sulfur-containing compounds, such as dimethyl sulfoxide, sulfolane, and thiodiethanol; propylene carbonate; and ethylene carbonate.

When paper is used as a print medium, a C8 or higher polyol compound or a glycol ether compound is preferably used as the organic solvent to improve permeation of the ink into the paper.

Specific examples of the C8 or higher polyol compound include, but are not limited to, 2-ethyl-1,3-hexanediol and 2,2,4-trimethyl-1,3-pentanediol.

Specific examples of the glycol ether compound include, but are not limited to: polyvalent alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyvalent alcohol aryl ethers, such as ethylene glycol monophenyl ether and ethylene glycol monobenzyl ether.

The boiling point of the organic solvent is not particularly limited. Considering wetting effects and excellent drying, the boiling point thereof is preferably 250° C. or lower.

The proportion of the organic solvent in the ink of the present disclosure is not particularly limited and may be appropriately selected depending on the intended purpose. Considering drying and discharge stability of the ink, the proportion thereof in the ink is preferably 10% by mass or greater but 60% by mass or less and more preferably 20% by mass or greater but 60% by mass or less.

The proportion of the organic solvent in the ink produced by the method for producing ink of the present disclosure is not particularly limited and may be appropriately selected depending on the intended purpose. Considering drying and discharge stability of the ink, the proportion thereof in the ink is preferably 10% by mass or greater but 60% by mass or less and more preferably 20% by mass or greater but 60% by mass or less.

—Resin—

The resin for use in the ink and method for producing ink of the present disclosure is not particularly limited and may be appropriately selected depending on the intended purpose. Examples thereof include, but are not limited to, a urethane resin, a polyester resin, an acrylic resin, a vinyl acetate-based resin, a styrene-based resin, a butadiene-based resin, a styrene-butadiene-based resin, a vinyl chloride-based resin, an acrylic styrene-based resin, and an acrylic silicone-based resin. Resin particles formed of any of the above-listed resins may be used. These may be used alone or in combination.

The resin particles may be dispersed in water serving as a dispersion medium to be formed into a resin emulsion, and the resin emulsion may be mixed with other materials, such as a coloring material and an organic solvent, to obtain an ink.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The proportion of the resin in the ink of the present disclosure is not particularly limited and may be appropriately selected depending on the intended purpose. Considering fixability and storage stability of the ink, the proportion thereof in the ink is preferably 1% by mass or greater but 30% by mass or less and more preferably 5% by mass or greater but 20% by mass or less.

The proportion of the resin in the ink produced by the method for producing ink of the present disclosure is not particularly limited and may be appropriately selected depending on the intended purpose. Considering fixability and storage stability of the ink, the proportion thereof in the ink is preferably 1% by mass or greater but 30% by mass or less and more preferably 5% by mass or greater but 20% by mass or less.

—Alkaline Earth Metal Ion—

The alkaline earth metal ion used in the ink and method for producing ink of the present disclosure are not particularly limited and may be appropriately selected depending on the intended purpose. Examples thereof include, but are not limited to, calcium ions, and magnesium ions.

The amount of the alkaline earth metal ion in the ink of the present disclosure is preferably 50 ppm or less, and more preferably 30 ppm or less because the alkaline earth metal ion may dissolve the below mentioned silicone resin included in the ink repellent layer.

The amount of the alkaline earth metal ion used in the method for producing ink of the present disclosure is preferably 50 ppm or less, and more preferably 30 ppm or less because the alkaline earth metal ion may dissolve the below mentioned silicone resin included in the ink repellent layer.

—Additives—

The additives used in the ink and method for producing ink of the present disclosure are not particularly limited and may be appropriately selected depending on the intended purpose. Examples thereof include, but are not limited to, a surfactant, a preservative and fungicide, a corrosion inhibitor, and a pH regulator, according to the necessity.

——Surfactant——

The surfactant is not particularly limited and may be appropriately selected depending on the intended purpose. Examples thereof include, but are not limited to, a silicone-based surfactant, a fluorine-based surfactant, an amphoteric surfactant, a nonionic surfactant, and an anionic surfactant.

These may be used alone or in combination.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane.

The side-chain-modified polydimethylsiloxane is, for example, polydimethylsiloxane represented by Chemical Formula (S-1) below, where a modifying group is introduced in the side chain of the Si site.

The both end-modified polydimethylsiloxane is, for example, polydimethylsiloxane represented by Chemical Formula (S-1) below, where modifying groups are introduced at the both ends thereof.

The one-end-modified polydimethylsiloxane is, for example, polydimethylsiloxane represented by Chemical Formula (S-1) below, where a modifying group is introduced at one of the ends thereof.

The side-chain-both-end-modified polydimethylsiloxane is, for example, polydimethylsiloxane represented by Chemical Formula (S-1) below, where a modifying group is introduced in the side chain of the Si site, and modifying groups are introduced at the both ends thereof.

For example, the side-chain-modified polydimethylsiloxane is dimethylpolysiloxane represented by Chemical Formula (S-1), where a polyalkylene oxide structure represented by Chemical Formula (S-2) is introduced into the side chain X of the Si site thereof to form a polyether-modified silicone-based surfactant.

Chemical Formula (S-1)

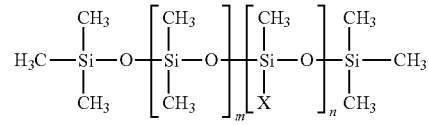

(In Chemical Formula (S-1), m and n are each independently an integer, and X is a side chain.)

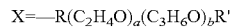   Chemical Formula (S-2)

(In Chemical Formula (S-2), a and b are each independently an integer, R is an alkylene group, and R' is an alkyl group.)

The modifying group is not particularly limited and may be appropriately selected depending on the intended purpose. Examples thereof include, but are not limited to, a polyoxyethylene group, a polyoxyethylene polyoxypropylene group, and a polyalkylene oxide structure.

The silicone-based surfactant may be appropriately synthesized for use, or may be selected from commercial products.

For example, commercial products of the silicone-based surfactant are obtained from BYK, Shin-Etsu Chemical Co., Ltd., Dow Corning Toray Co., Ltd., NIHON EMULSION Co., Ltd., Kyoeisha Chemical Co., Ltd., etc.

As the polyether-modified silicone-based surfactant, commercial products can be used. Examples thereof include, but are not limited to: KF-642 and KF-643 (both obtained from Shin-Etsu Chemical Co., Ltd.); and DOWSIL FZ-2105, DOWSIL FZ-2154, DOWSIL FZ-2161, DOWSIL FZ-2162, and DOWSIL FZ-2164 (all obtained from Dow Corning Toray Co., Ltd.).

The fluorine-based surfactant is not particularly limited and may be appropriately selected depending on the intended purpose. Examples thereof include, but are not limited to, perfluoroalkyl sulfonic acid compounds, perfluoroalkyl carboxylic acid compounds, perfluoroalkyl phosphoric acid ester compounds, perfluoroalkyl ethylene oxide adducts, and polyoxyalkylene ether polymer compounds each having a perfluoroalkyl ether group in a side chain thereof. Of these, a polyoxyalkylene ether polymer compound having a perfluoroalkyl ether group in a side chain thereof is preferable considering low foamability thereof.

The fluorine-based surfactant is more preferably any of compounds represented by Chemical Formulae (F-1) and (F-2) below.

$CF_3CF_2(CF_2CF_2)_m$—$CH_2CH_2O(CH_2CH_2O)_n$H  Chemical Formula (F-1)

(In Chemical Formula (F-1), m and n are each independently an integer.)

In order to impart water solubility, in the compound represented by Chemical Formula (F-1), m is preferably an integer of from 0 through 10, and n is preferably an integer of from 0 through 40.

$C_nF_{2n+1}$—$CH_2CH(OH)CH_2$—$O$—$(CH_2CH_2O)_a$—Y (In Chemical Formula (F-2), Y is H, or $CmF_{2m+1}$, where m is an integer of from 1 through 6, or $CH_2CH(OH)CH_2$—$CmF_{2m+1}$, where m is an integer of from 4 through 6, or $CpH_{2p+1}$, where p is an integer of from 1 through 19; n is an integer of from 1 through 6; and a is an integer of from 4 through 14.)

Specific examples of the perfluoroalkyl sulfonic acid compound include, but are not limited to, perfluoroalkyl sulfonic acid, and perfluoroalkyl sulfonic acid salt. Specific examples of the perfluoroalkyl carboxylic acid compound include, but are not limited to, perfluoroalkyl carboxylic acid, and perfluoroalkyl carboxylic acid salt. Specific examples of the polyoxyalkylene ether polymer compound having a perfluoroalkyl ether group in a side chain thereof include, but are not limited to, sulfuric acid ester salt of a polyoxyalkylene ether polymer having a perfluoroalkyl ether group in a side chain thereof, and salt of a polyoxyalkylene ether polymer having a perfluoroalkyl ether group in a side chain thereof.

A counter ion of the salt of the fluorine-based surfactant is not particularly limited and may be appropriately selected depending on the intended purpose. Examples thereof include, but are not limited to, Li, Na, K, $NH_4$, $NH_3CH_2CH_2OH$, $NH_2(CH_2CH_2OH)_2$, and $NH(CH_2CH_2OH)_3$.

The fluorine-based surfactant is not particularly limited and may be appropriately selected depending on the intended purpose. The fluorine-based surfactant is preferably a compound in which the number of carbon atoms substituted with fluorine is from 2 through 16, and more preferably a compound in which the number of carbon atoms substituted with fluorine is from 4 through 16.

The fluorine-based surfactant may be selected from commercial products, or may be appropriately synthesized for use.

Examples of commercial products of the fluorine-based surfactant include, but are not limited to: SURFLON S-111, SURFLON SURFLON S-112, SURFLON S-113, SURFLON S-121, SURFLON S-131, SURFLON S-132, SURFLON S-141, and SURFLON S-145 (all obtained from ASAHI GLASS CO., LTD.); FLUORAD FC-93, FLUORAD FC-95, FLUORAD FC-98, FLUORAD FC-129, FLUORAD FC-135, FLUORAD FC-170C, FLUORAD FC-430, and FLUORAD FC-431 (all obtained from SUMITOMO 3M); MEGAFACE F-470, MEGAFACE F-1405, and MEGAFACE F-474 (all obtained from DIC CORPORATION); ZONYL TBS, ZONYL FSP, ZONYL FSA, ZONYL FSN-100, ZONYL FSN, ZONYL FSO-100, ZONYL FSO, ZONYL FS-300, ZONYL UR, CAPSTONE FS-30, CAPSTONE FS-31, CAPSTONE FS-3100, CAPSTONE FS-34, and CAPSTONE FS-35 (all obtained from The Chemours Company); FT-110, FT-250, FT-251, FT-150, and FT-400SW (all obtained from NEOS COMPANY LIMITED); POLYFOX PF-136A, POLYFOX PF-156A, POLYFOX PF-151N, POLYFOX PF-154, and POLYFOX PF-159 (all obtained from OMNOVA SOLUTIONS INC.); and UNIDYNE DSN-403N (obtained from DAIKIN INDUSTRIES, LTD.). Of these, ZONYL FS-300, ZONYL FS-3100, CAPSTONE FS-34 (obtained from The Chemours Company), FT-110, FT-250, FT-251, FT-400S, FT-150, and FT-400SW (all obtained from NEOS COMPANY LIMITED), POLYFOX PF-151N (obtained from OMNOVA SOLUTIONS INC.), and UNIDYNE DSN-403N (obtained from DAIKIN INDUSTRIES, LTD.) are preferable considering excellent print quality, especially color development, and improvements in permeation to paper, wettability, and uniform dying.

The amphoteric surfactant is not particularly limited and may be appropriately selected depending on the intended purpose. Examples thereof include, but are not limited to, lauryl aminopropionic acid salt, lauryl dimethyl betaine, stearyl dimethyl betaine, and lauryl dihydroxyethyl betaine.

The nonionic surfactant is not particularly limited and may be appropriately selected depending on the intended purpose. Examples thereof include, but are not limited to, polyoxyethylene alkyl phenyl ether, polyoxyethylene alkyl ester, polyoxyethylene alkyl amine, polyoxyethylene alkyl amide, polyoxyethylene propylene block polymer, sorbitan fatty acid ester, polyoxyethylene sorbitan fatty acid ester, and acetylene alcohol ethylene oxide adducts.

The anionic surfactant is not particularly limited and may be appropriately selected depending on the intended purpose. Examples thereof include, but are not limited to, polyoxyethylene alkyl ether acetic acid salt, dodecyl benzene sulfonic acid salt, lauryl acid salt, and polyoxyethylene alkyl ether sulfate salt.

The total proportion of the surfactant(s) in the ink of the present disclosure is not particularly limited and may be appropriately selected depending on the intended purpose. Considering excellent wettability and discharge stability and improvement in image quality, the proportion thereof in the ink is preferably 0.001% by mass or greater but 5% by mass or less and more preferably 0.05% by mass or greater but 5% by mass or less.

The total proportion of the surfactant(s) in the ink produced by the method for producing ink of the present disclosure is not particularly limited and may be appropriately selected depending on the intended purpose. Considering excellent wettability and discharge stability and improvement in image quality, the proportion thereof is preferably 0.001% by mass or greater but 5% by mass or less and more preferably 0.05% by mass or greater but 5% by mass or less.

The surfactant may be used as a defoaming agent.

The defoaming agent is not particularly limited and may be appropriately selected depending on the intended purpose. Examples thereof include, but are not limited to, a silicone-based defoaming agent, a polyether-based defoaming agent, and a fatty acid ester-based defoaming agent. Of these, a silicone-based defoaming agent is preferable because of an excellent defoaming effect thereof.

These may be used alone or in combination.

——Preservative and Fungicide——

The preservative and fungicide used in the ink and method for producing ink of the present disclosure are not particularly limited. Examples thereof include, but are not limited to, 1,2-benzisothiazolin-3-one.

——Corrosion Inhibitor——

The corrosion inhibitor used in the ink and method for producing ink of the present disclosure is not particularly limited as long as the corrosion inhibitor is a compound exhibiting a corrosion inhibition effect. Examples thereof include, but are not limited to, a heterocyclic aromatic compound.

The heterocyclic aromatic compound is bonded with a metal ion to form a non-soluble coating film to thereby exhibit a corrosion inhibition effect on a metal area inside a nozzle.

The heterocyclic aromatic compound is not particularly limited, and may be appropriately selected depending on the intended purpose. Examples thereof include, but are not limited to, a benzotriazole compound.

The benzotriazole compound is not particularly limited, and may be appropriately selected depending on the intended purpose. Examples thereof include, but are not limited to, benzotriazole, carboxybenzotriazole, 2-(2-hydroxy-5-methylphenyl)benzotriazole, 2-(2-hydroxy-5-t-butylphenyl)benzotriazole, and 2-(2-hydroxy-5-t-octylphenyl)benzotriazole.

The proportion of the benzotriazole compound in the ink of the present disclosure is not particularly limited and may be appropriately selected depending on the intended purpose. The proportion thereof in the ink is preferably from 0.001% by mass through 1.0% by mass and more preferably from 0.005% by mass through 0.5% by mass.

The proportion of the benzotriazole compound in the ink produced by the method for producing ink of the present disclosure is not particularly limited and may be appropriately selected depending on the intended purpose. The proportion thereof in the ink is preferably from 0.001% by mass through 1.0% by mass and more preferably from 0.005% by mass through 0.5% by mass.

——pH Regulator——

The pH regulator used in the ink and method for producing ink of the present disclosure is not particularly limited, and may be appropriately selected depending on the intended purpose. Examples thereof include, but are not limited to, amines, such as diethanolamine and triethanolamine.

<Physical Properties of Ink>

In the ink and method for producing ink of the present disclosure, the physical properties of the ink are not particularly limited and may be appropriately selected depending on the intended purpose. For example, the viscosity, surface tension, pH, etc. of the ink are preferably within the following ranges.

In the ink and method for producing ink of the present disclosure, the viscosity of the ink at 25° C. is not particularly limited. The viscosity thereof is preferably 5 mPa·s or greater but 30 mPa·s or less and more preferably 5 mPa·s or greater but 25 mPa·s or less, because image density and letter print quality are improved and excellent discharge performance is achieved.

For example, the viscosity can be measured by means of a rotary viscometer (RE-80L, obtained from TOKI SANGYO CO., LTD.). As measuring conditions, the measurement can be performed at 25° C., at 50 rpm for 3 minutes with a standard cone rotor (1°34'×R24), and with a sample fluid amount of 1.2 mL.

In the ink and method for producing ink of the present disclosure, the surface tension of the ink at 25° C. is not particularly limited. The surface tension thereof is preferably 35 mN/m or less and more preferably 32 mN/m or less considering desirable leveling of the ink on a print medium and a shorter drying time of the ink.

The pH of the ink of the present disclosure at 25° C. is 4 or higher but 8.5 or lower. Considering anti-corrosion of a metal member to be in contact with the ink, the pH of the ink of the present disclosure at 25° C. is preferably 6 or higher but 8 or lower.

In the method for producing ink of the present disclosure, the pH of the ink at 25° C. is not particularly limited. The pH thereof is preferably from 4 through 8 and more preferably from 5 through 7 considering anti-corrosion of a metal member to be in contact with the ink.

(Inkjet System)

The inkjet system of the present disclosure includes a discharging unit, and may further include other units according to the necessity. The discharging unit is configured to discharge the ink of the present disclosure from an inkjet head having a nozzle substrate.

<Discharging Unit>

The discharging unit includes an inkjet head, and may further include other members according to the necessity.

The inkjet head includes the nozzle substrate that may be made of SUS, and may further include other members according to the necessity.

The nozzle substrate includes an ink repellent layer including a silicone resin, and may further include other members according to the necessity.

—Ink Repellent Layer—

The ink repellent layer is formed on a surface of the nozzle substrate from which an ink is discharged. A shape, structure, thickness, etc. of the ink repellent layer are not particularly limited and may be appropriately selected depending on the intended purpose.

The material of the ink repellent layer is not particularly limited as long as the material repels an ink, and may be appropriately selected depending on the intended purpose. Examples thereof include, but are not limited to, a silicone-based water repellent material and a fluorine-based water repellent material. Of these, a silicone-based water repellent material is preferable.

Examples of the silicone-based water repellent material include, but are not limited to, room temperature-curable liquid silicone resins or elastomers and UV-curable liquid silicone resins or elastomers.

Examples of the fluorine-based water repellent material include, but are not limited to, heat-curable liquid silicone resins or elastomers.

Any of the above-listed materials is applied onto a surface of a nozzle substrate, and is left to stand in the air at room temperature to undergo polymerization curing, UV curing, or thermal curing, to form an ink repellent layer.

The silicone resin is a resin having a siloxane bond formed of Si and O as a basic skeleton. The silicone resin is available on the market in various forms, such as oil, a resin, and an elastomer. Other than ink repellency, the silicone resin has various properties, such as heat resistance, releasability, defoamability, and adhesion.

The viscosity of the silicone resin is preferably 1,000 mPa·s or less.

In order to secure sufficient ink repellency against an ink including a fluorine-based surfactant, the ink repellent layer is preferably formed of a structure including a silicone resin and/or a fluororesin.

The structure including the silicone resin and/or the fluororesin is formed of a silicone resin alone, a fluororesin alone, or a mixture with another resin or constitutional component, such as a metal. Examples thereof include, but are not limited to, a structure where silicone resin particles are dispersed in a fluororesin, a kneaded product of a silicone resin and polypropylene, and a structure obtained by eutectoid plating of Ni with a silicone resin or a fluororesin. In order to prevent elution of a silicone resin, a mixture of a silicone resin and another constitutional component is effectively used.

As a method for forming the ink repellent layer on the surface of the nozzle substrate, in addition to the above-described method including coating followed by curing, and the Ni eutectoid plating, there are methods, such as electrodeposition of a fluororesin, vacuum vapor deposition, and plasma polymerization of silicone oil.

When an ink repellent layer is formed by a method other than electrodeposition, nozzle pores and a back surface of a nozzle substrate are masked with a photoresist, a water-soluble resin, etc., an ink repellent layer is formed, and then the resist is peeled and removed, to thereby form the ink repellent layer only on the front surface of the nozzle substrate. However, attention should be paid to a potential damage to the ink repellent layer, when a highly alkaline stripping agent is used.

The average thickness of the ink repellent layer is not particularly limited and may be appropriately selected depending on the intended purpose. The average thickness thereof is preferably 0.1 μm or greater but 5.0 μm or less and more preferably 0.1 μm or greater but 1.0 μm or less.

When the average thickness thereof is 0.1 μm or greater, durability against wiping is not degraded, and ink repellency is not degraded after long-term use. Therefore, the ink repellent layer having such an average thickness is preferable.

When the thickness thereof is 5.0 μm or less, a problem of increased production cost due to the thickness thereof larger than necessary can be avoided. Therefore, the ink repellent layer having such an average thickness is preferable.

The surface roughness (Ra) of the ink repellent layer is not particularly limited and may be appropriately selected depending on the intended purpose. The surface roughness (Ra) is preferably 0.2 μm or less. When the surface roughness is 0.2 μm or less, residues left after wiping can be reduced. Therefore, the ink repellent layer having such surface roughness (Ra) is preferable.

—SUS—

The SUS is not particularly limited and may be appropriately selected depending on the intended purpose. Examples thereof include SUS304, SUS316, SUS303, and SUS321.

In the present disclosure, "printing" means a method for forming, for example, an image on a print medium using the inkjet system of the present disclosure.

<Print Medium>

A print medium for use in the present disclosure is a target for printing using the inkjet system of the present disclosure.

The print medium means a medium on which any of inks or various processing fluids can be deposited even temporarily.

The print medium is not particularly limited. Examples thereof include, but are not limited to, plain paper, gloss paper, special paper, cloth, films, transparent plastic sheets, and printing paper for general purposes.

The print medium is not limited to those used as typical print media. As the print medium, building materials (e.g., wall paper, floor materials, and tiles), fabrics (e.g., T-shirts and fabrics for clothes), textiles, and leather may be appropriately used. Moreover, ceramics, glass, or a metal may be used by appropriately adjusting a structure of a transporting channel of the print medium.

<Printed Matter>

The printed matter is obtained by printing by a printing device or printing method using the inkjet system of the present disclosure.

The printed matter includes an image formed by the inkjet system of the present disclosure on the print medium.

<Printing Device and Printing Method>

The printing device and printing method for use in the present disclosure are a device including the inkjet system of the present disclosure capable of discharging any of an ink and various processing fluids on a print medium, and a method for printing using the device, respectively.

The ink of the present disclosure and an ink obtained in the method for producing ink of the present disclosure can be suitably used in various printing devices according to an inkjet printing system, such as printers, facsimile machines, photocopiers, printer/fax/photocopier multifunction peripherals, and 3D model manufacturing devices.

The printing device may include, not only a head configured to discharge an ink, but also units associated with feeding, transporting, and paper ejection of the print medium, and other devices, which are referred to as a pre-processing device and a post-processing device.

The printing device may include a heating unit and a drying unit.

The printing method may include a heating step and a drying step.

For example, the heating unit and the drying unit include a unit configured to heat or dry a printed surface or back surface of the print medium.

The heating unit and the drying unit are not particularly limited. For example, a fan heater or an IR heater may be used.

The heating step and the drying step may be performed before, during, or after printing.

The printing device and the printing method are not limited to application for visualization of meaningful images, such as texts and figures, with the ink. For example, the printing device and the printing method are also used for forming patterns, such as geometric designs, and shaping 3D images.

Unless otherwise stated, the printing device includes both a serial-type device, in which a discharge head is driven to move, and a line-type device, in which a discharge head is not driven to move.

Furthermore, in addition to the desktop type, this printing device includes a wide type capable of printing images on a large print medium such as A0, a continuous printer capable of using continuous paper wound up in a roll form as print media.

The printing device may include, not only a part configured to discharge an ink, but also devices, which are referred to as a pre-processing device and a post-processing device.

One embodiment of the pre-processing device and the post-processing device is, similar to the case of an ink of black (K), cyan (C), magenta (M), or yellow (Y), that a liquid storage unit including the pre-processing fluid or the post-processing fluid and the liquid discharging head are added to discharge the pre-processing fluid or the post-processing fluid according to an inkjet printing system.

Another embodiment of the pre-processing device and the post-processing device is that the pre-processing device or the post-processing device other than the inkjet printing system, such as blade coating, roll coating, and spray coating, is disposed.

The 3D modeling device for forming the 3D model is not particularly limited and may be selected from those known in the art for use. For example, a device including an ink storage unit, an ink supply unit, a discharge unit, a drying unit, etc. may be used. The 3D model includes a 3D model obtained by superimposing the ink. Moreover, the 3D model also includes a shaped product obtained by processing a structure in which the ink is applied on a base, such as a print medium. The shaped product is a product obtained by shaping, such as heat drawing and punching, a print or structure formed into a sheet or a film. For example, the 3D modeling device is suitably used for shaping after decorating surfaces, such as gauges or panels of control units of vehicles, office appliances, electric or electronic devices, and cameras.

Figure 4:
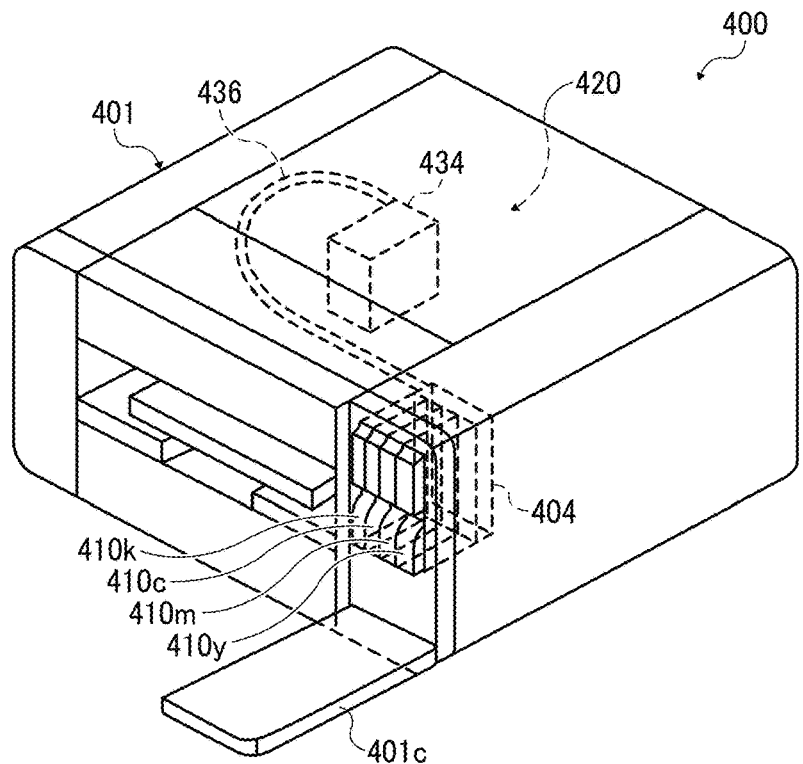
FIG. 4 is a schematic overall view of an inkjet system according to one embodiment of the present disclosure.
Figure 5:
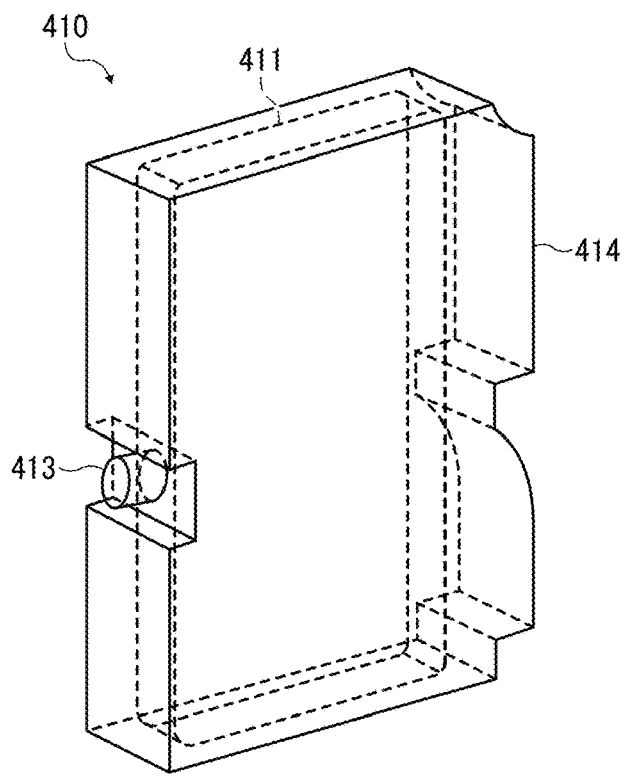
FIG. 5 is a schematic view of a main tank in the inkjet system illustrated in FIG. 4.

One example of the printing device will be described below with reference to FIGS. 4 and 5. FIG. 4 is a perspective view illustrating the printing device. FIG. 5 is a perspective view illustrating a main tank.

The image forming apparatus 400 as an example of the printing device is a serial-type image forming apparatus. A mechanical unit 420 is disposed in a housing 401 of the image forming apparatus 400. An ink storage unit 411 of each of main tanks 410 (410k, 410c, 410m, 410y) for respective colors, black (K), cyan (C), magenta (M), and yellow (Y) is formed of a packing member, such as an aluminium laminate film. The ink storage unit 411 is, for example, stored in a plastic storage container case 414. Therefore, the main tank 410 can be used as an ink cartridge for each color.

A cartridge holder 404 is disposed at the rear side of the opening when a cover 401c of the apparatus main body is opened. The main tank 410 is detachably mounted in the cartridge holder 404. As a result, each ink outlet 413 of the main tank 410 and a discharge head 434 for each color are communicated via a supply tube 436 for each color, and the ink can be discharged from the discharge head 434 to a print medium.

Use of the ink of the present disclosure and an ink obtained by the method for producing ink of the present disclosure is not particularly limited and may be appropriately selected depending on the intended purpose. For example, the ink may be applied for printed matter, coating agents, coating materials, inks for foundation. Moreover, the ink may be used not only for forming two-dimensional letters or images, but also as a 3D modeling material for forming a three-dimensional object (3D model).

In the present specification, the terms "image formation," "recording," "letter printing," "printing," etc. are all synonyms.

In the present specification, the terms "water-repellent film," "ink-repellent film," "water-repellent layer," "ink repellent layer," etc. are all synonyms.

EXAMPLES

The present disclosure will be described below by way of Examples. The present disclosure should not be construed as being limited to these Examples.

<Preparation of Ink>

A container was charged with the materials except organic acid according to the composition presented in Tables 5 and 6. The resultant mixture was stirred for 2 hours, followed by filtering the mixture with a membrane filter having a pore diameter of 0.45 μm, to obtain inks of Examples 1 to 6 and Comparative Examples 1 to 4.

Bk5 (C.I. Reactive Black 5)
Bk39 (C.I. Reactive Black 39)
Y95 (C.I. Reactive Yellow 95)
Acetic acid (obtained from FUJIFILM Wako Pure Chemical Corporation)
Formic acid (obtained from FUJIFILM Wako Pure Chemical Corporation)
Malonic acid (obtained from Tokyo Chemical Industry Co., Ltd.)
Glycerin (obtained from FUJIFILM Wako Pure Chemical Corporation)
2-Pyrrolidone (obtained from Mitsubishi Chemical Corporation)
Caprolactam (obtained from Ube Industries, Ltd.)
Dipropylene glycol (obtained from SUMITOMO CHEMICAL COMPANY, LIMITED)
Propylene glycol (obtained from FUJIFILM Wako Pure Chemical Corporation)
Benzotriazole (obtained from JOHOKU CHEMICAL CO., LTD.)
Water (ion-exchanged water)

After measuring the pH, electric conductivity, and Ca ion amount of each of the obtained inks of Examples 1 to 6 and Comparative Examples 1 to 4, wettability on a nozzle substrate having an ink repellent layer and SUS was evaluated. The results are presented in Tables 5 and 6.

The pH was measured by maintaining the temperature of each ink raw material at 25° C. and measuring the ink raw material by means of a multi-function water quality meter (obtained from DKK-TOA CORPORATION).

The electric conductivity was measured by means of a multi-function water quality meter (obtained from DKK-TOA CORPORATION).

The alkali metal ion amount was measured through quantitative analysis by means of ICPE-9000 (obtained from Shimadzu Corporation) at the sample feeding rate of 0.4 mL, diluting with 7.6 mL of water.

<Evaluation of Wettability on Ink Repellent Layer Including Silicone Resin>

A contact angle of water on an ink repellent layer of a nozzle substrate was measured before immersing the nozzle substrate in the ink, where the ink repellent layer includes a silicone resin. As an inkjet head having the nozzle substrate having the ink repellent layer including the silicone resin, an MH5320 head (obtained from Ricoh Company Limited) was used. Thereafter, the inkjet head was charged with each of the inks of Examples 1 to 6 and Comparative Examples 1 to 4, and the inkjet head including the nozzle surface was immersed in the ink and stored for 4 weeks at 50° C. After that, a contact angle of water on the ink repellent layer of the nozzle substrate was measured. The contact angle before immersing the nozzle substrate in the ink raw materials was determined as 100%, and the wettability was evaluated based on the following evaluation criteria. The result of B, A, AA, or AAA is determined as a practically usable level.

[Evaluation Criteria of Wettability of Ink Repellent Layer]

AAA: Contact angle after the immersion is 97.5% or greater.
AA: Contact angle after the immersion is 95% or greater but less than 97.5%.
A: Contact angle after the immersion is 87% or greater but less than 95%.
B: Contact angle after the immersion is 60% or greater but less than 87%.
C: Contact angle after the immersion is less than 60%.

<Evaluation of Wettability on SUS>

A weight of SUS before being immersed in each of the inks prepared in Examples 1 to 6 and Comparative Examples 1 to 4 was measured. Thereafter, the SUS was immersed in the ink and stored for 4 weeks at 50° C., followed by measuring the weight SUS after immersion in the ink. The weight of SUS before immersion in the ink was determined as 100%, and wettability was evaluated as described below. The result of B, A, or AA is determined as a practically usable level. As the SUS, SUS303 parallel pin (obtained from Fastening-J) was used.

[Evaluation Criteria of Wettability on SUS]

AA: The weight after the immersion was 97.5% or greater.
A: The weight after the immersion was 95% or greater but less than 97.5%.
B: The weight after the immersion was 90% or greater but less than 95%.
C: The weight after the immersion was less than 90%.

TABLE 5

| Components (% by mass) | | Example 1 | 2 | 3 | 4 | 5 | 6 |
|---|---|---|---|---|---|---|---|
| Colorant | amount | 10 | 10 | 10 | 10 | 10 | 10 |
| | dye | Y95 | Y95 | Y95 | Y95 | Y95 | Y95 |
| Organic acid | acetic acid (pKa = 4.7) | — | — | 5.0 | 10.0 | — | 20.0 |
| | formic acid (pKa = 3.8) | — | 10.0 | — | — | — | — |
| | malonic acid (pKa = 2.8) | 10.0 | — | — | — | 20.0 | — |
| Other components | glycerin | 5 | 5 | 5 | 5 | 5 | 5 |
| | 2-pyrrolidone | 5 | 5 | 5 | 5 | 5 | 5 |
| | caprolactam | 10 | 10 | 10 | 10 | 10 | 10 |
| | dipropylene glycol | 15 | 15 | 15 | 15 | 15 | 15 |
| | propylene glycol | 10 | 10 | 10 | 10 | 10 | 10 |
| | benzotriazole | 0.1 | 0.1 | 0.1 | 0.1 | 0.1 | 0.1 |
| Water | | 44.9 | 44.9 | 49.9 | 44.9 | 34.9 | 34.9 |
| Ca (ppm) | | 45 | 45 | 45 | 45 | 45 | 45 |
| Measurements and evaluations of ink | pH | 6.1 | 6.3 | 6.8 | 6.5 | 5.5 | 6.0 |
| | electric conductivity | 244 | 244 | 244 | 244 | 244 | 244 |
| | wettability on ink repellent layer | AAA | AA | A | A | AAA | A |
| | wettability on SUS | AA | AA | AA | AA | B | A |
| | value of right side of Expression (1) | 941.7 | 861.1 | 659.6 | 780.5 | 1183.5 | 982 |
| | Expression (1) satisfied or dissatisfied | Satisfied | Satisfied | Satisfied | Satisfied | Satisfied | Satisfied |

TABLE 6

| Components (% by mass) | | Comparative Example 1 | 2 | 3 | 4 |
|---|---|---|---|---|---|
| Colorant | amount | 10 | 25 | 20 | 15 |
| | dye | Bk39 | Bk5 | Bk5 | Bk39 |
| Organic acid | acetic acid (pKa = 4.7) | — | — | — | — |
| | formic acid (pKa = 3.8) | — | — | — | — |
| | malonic acid (pKa = 2.8) | — | — | 10.0 | — |

TABLE 6-continued

|  | | Comparative Example | | | |
|---|---|---|---|---|---|
| Components (% by mass) | | 1 | 2 | 3 | 4 |
| Other components | glycerin | 5 | 5 | 5 | 5 |
| | 2-pyrrolidone | 5 | 5 | 5 | 5 |
| | caprolactam | 10 | 10 | 10 | 10 |
| | dipropylene glycol | 15 | 15 | 15 | 15 |
| | propylene glycol | 10 | 10 | 10 | 10 |
| | benzotriazole | — | — | — | — |
| | water | 55.0 | 55.0 | 45.0 | 55.0 |
| | Ca (ppm) | 13 | 55 | 55 | 13 |
| Measurements and evaluations of ink | pH | 8.2 | 3.8 | 3.7 | 8.6 |
| | electric conductivity | 736 | 1450 | 1450 | 800 |
| | wettability on ink repellent layer | C | B | B | C |
| | wettability on SUS | A | C | C | A |
| | value of right side of Expression (1) | 101.45 | 1868.6 | 1908.9 | −65.8 |
| | Expression (1) satisfied or dissatisfied | Dissatisfied | Satisfied | Satisfied | Dissatisfied |

<Preparation of Ink Raw Materials>

A container was charged with the materials except organic acid according to the composition presented in Tables 7 to 9. The resultant mixture was stirred for 2 hours, followed by filtering the mixture with a membrane filter having a pore diameter of 0.45 μm, to obtain each of ink raw materials of Examples 7 to 15 and Comparative Examples 5 to 7.

- Acetic acid (obtained from FUJIFILM Wako Pure Chemical Corporation)
- Formic acid (obtained from FUJIFILM Wako Pure Chemical Corporation)
- Malonic acid (obtained from Tokyo Chemical Industry Co., Ltd.)
- Red 24 (C.I. Reactive Red 24)
- Red 245 (C.I. Reactive Red 245)
- Or 13 (C.I. Reactive Orange 13)
- Bl 49 (C.I. Reactive Blue 49)
- Bk 39 (C.I. Reactive Black 39)
- Glycerin (obtained from FUJIFILM Wako Pure Chemical Corporation)
- 2-Pyrrolidone (obtained from Mitsubishi Chemical Corporation)
- Caprolactam (obtained from Ube Industries, Ltd.)
- Dipropylene glycol (obtained from SUMITOMO CHEMICAL COMPANY, LIMITED)
- Propylene glycol (obtained from FUJIFILM Wako Pure Chemical Corporation)
- Benzotriazole (obtained from JOHOKU CHEMICAL CO., LTD.)
- Water (ion-exchanged water)

After measuring the pH, electric conductivity, and Ca ion amount of each of the obtained ink raw materials of Examples 7 to 15 and Comparative Examples 5 to 7, wettability on a nozzle substrate having an ink repellent layer including a silicone resin and wettability on SUS were evaluated in the same manner as the method used to evaluate the inks of Examples 1 to 6 and Comparative Examples 1 to 4.

According to the composition presented in Tables 7 to 9, organic acid was added to each of the prepared ink raw materials of Examples 7 to 15 and Comparative Examples 5 to 7 in a container, followed by stirring to obtain an ink. After measuring the pH, electric conductivity, and Ca ion amount of each of the obtained inks, wettability on a nozzle substrate having an ink repellent layer including a silicone resin and wettability on SUS were evaluated in the same manner as the method used to evaluate the inks of Examples 1 to 6 and Comparative Examples 1 to 4.

TABLE 7

|  | | Example | | | | |
|---|---|---|---|---|---|---|
| Components (% by mass) | | 7 | 8 | 9 | 10 | 11 |
| Colorant | amount | 10 | 10 | 10 | 10 | 10 |
| | dye | Bk39 | B149 | Or13 | Red24 | Bk39 |
| Organic acid | acetic acid (pKa = 4.7) | — | — | 3 | 5 | — |
| | formic acid (pKa = 3.8) | — | — | — | 5 | 10 |
| | malonic acid (pKa = 2.8) | 10 | 10 | 7 | — | — |
| Other components | glycerin | 5 | 5 | 5 | 5 | 5 |
| | 2-pyrrolidone | 5 | 5 | 5 | 5 | 5 |
| | caprolactam | 10 | 10 | 10 | 10 | 10 |
| | dipropylene glycol | 15 | 15 | 15 | 15 | 15 |
| | propylene glycol | 10 | 10 | 10 | 10 | 10 |
| | benzotriazole | 0.1 | 0.1 | 0.1 | 0.1 | 0.1 |
| | Water | 54.9 | 54.9 | 54.9 | 54.9 | 54.9 |
| | Ca (ppm) | 13 | 23 | 19 | 7 | 13 |

TABLE 7-continued

|  |  | Example | | | | |
| --- | --- | --- | --- | --- | --- | --- |
| Components (% by mass) | | 7 | 8 | 9 | 10 | 11 |
| Measurements and evaluations of ink raw materials (before adding organic acid) | pH | 8.2 | 7.6 | 7.7 | 8.0 | 8.2 |
| | electric conductivity | 736 | 488 | 312 | 474 | 736 |
| | wettability on ink repellent layer | C | C | C | C | C |
| | wettability on SUS | A | A | A | A | A |
| | value of right side of Expression (2) | 101.45 | 337.2 | 296.9 | 169.55 | 101.45 |
| | Expression (2) satisfied or dissatisfied | Satisfied | Satisfied | Satisfied | Satisfied | Satisfied |
| Measurements and evaluations of ink (after adding organic acid) | pH | 5.5 | 6.0 | 6.0 | 6.5 | 6.0 |
| | electric conductivity | 736 | 474 | 312 | 474 | 736 |
| | wettability on ink repellent layer | AA | AA | AA | A | A |
| | wettabilily on SUS | A | A | B | A | B |
| | value of right side of Expression (1) | 1181.5 | 982 | 982 | 780.5 | 982 |
| | Expression (1) satisfied or dissatisfied | Satisfied | Satisfied | Satisfied | Satisfied | Satisfied |

TABLE 8

|  |  | Example | | | |
| --- | --- | --- | --- | --- | --- |
| Components (% by mass) | | 12 | 13 | 14 | 15 |
| Colorant | amount | 10 | 10 | 10 | 10 |
| | dye | Red245 | Bk39 | Or13 | Red245 |
| Organic acid | acetic acid (pKa = 4.7) | 10 | 10 | 3 | 10 |
| | formic acid (pKa = 3.8) | — | — | — | — |
| | malonic acid (pKa = 2.8) | — | — | 7 | — |
| Other components | glycerin | 5 | 5 | 5 | 5 |
| | 2-pyrrolidone | 5 | 5 | 5 | 5 |
| | caprolactam | 10 | 10 | 10 | 10 |
| | dipropylene glycol | 15 | 15 | 15 | 15 |
| | propylene glycol | 10 | 10 | 10 | 10 |
| | benzotriazole | 0.1 | 0.1 | 0.1 | — |
| | Water | 54.9 | 54.9 | 54.9 | 55.0 |
| | Ca (ppm) | 44 | 13 | 55 | 44 |
| Measurements and evaluations of ink raw materials (before adding organic acid) | pH | 7.3 | 8.2 | 7.7 | 7.3 |
| | electric conductivity | 474 | 736 | 312 | 474 |
| | wettability on ink repellent layer | C | C | C | C |
| | wettability on SUS | A | A | A | A |
| | value of right side of Expression (2) | 458.1 | 101.15 | 296.9 | 458.1 |
| | Expression (2) satisfied or dissatisfied | Satisfied | Satisfied | Satisfied | Satisfied |
| Measurements and evaluations of ink (after adding organic acid) | pH | 5.5 | 6.5 | 6.0 | 5.5 |
| | electric conductivity | 474 | 736 | 312 | 474 |
| | wettability on ink repellent layer | A | B | B | B |
| | wettability on SUS | B | B | B | B |
| | value of right side of Expression (1) | 1183.5 | 780.5 | 982 | 1183.5 |
| | Expression (1) or dissatisfied | Satisfied | Satisfied | Satisfied | Satisfied |

TABLE 9

|  |  | Comparative Example | | |
| --- | --- | --- | --- | --- |
| Components (% by mass) | | 5 | 6 | 7 |
| Colorant | amount | 10 | 10 | 15 |
| | dye | Bk39 | Bk39 | Bk5 |
| Organic acid | acetic acid (pKa = 4.7) | — | 3 | — |
| | formic acid (pKa = 3.8) | — | — | — |
| | malonic acid (pKa = 2.8) | — | — | — |

TABLE 9-continued

|  |  | Comparative Example | | |
|---|---|---|---|---|
| Components (% by mass) | | 5 | 6 | 7 |
| Other components | glycerin | 5 | 5 | 5 |
|  | 2-pyrrolidone | 5 | 5 | 5 |
|  | caprolactam | 10 | 10 | 10 |
|  | dipropylene glycol | 15 | 15 | 15 |
|  | propylene glycol | 10 | 10 | 10 |
|  | benzotriazole | 0.1 | 0.1 | 0.1 |
|  | Water | 54.9 | 54.9 | 54.9 |
|  | Ca (ppm) | 13 | 13 | 55 |
| Measurements and evaluations of ink raw materials (before adding organic acid) | pH | 8.2 | 8.2 | 4.3 |
|  | electric conductivity | 736 | 736 | 1450 |
|  | wettability on ink repellent layer | C | C | A |
|  | wettability on SUS | A | A | A |
|  | value of right side of Expression (2) | 101.45 | 101.45 | 1667.1 |
|  | Expression (2) satisfied or dissatisfied | Satisfied | Satisfied | Disatisfied |
| Measurements and evaluations of ink (after adding organic acid) | pH | 8.2 | 7.5 | 3.7 |
|  | electric conductivity | 736 | 736 | 1430 |
|  | wettability on ink repellent layer | C | C | A |
|  | wettability on SUS | A | A | C |
|  | value of right side of Expression (1) | 101.45 | 377.5 | 1908.9 |
|  | Expression (1) or satisfied dissatisfied | Disatisfied | Disatisfied | Satisfied |

The invention claimed is:

1. An ink comprising:
water, and
a dye having a triazine skeleton,
wherein the ink satisfies Expression (1):

$$y \leq -403x + 3400 \qquad \text{Expression (1),}$$

where, in Expression (1), x is pH where x is $4 \leq x \leq 8.5$ and y is electric conductivity (mS/cm), further comprising organic acid in an amount of from 5 parts by mass through 20 parts by mass based on 100 parts by mass of the ink, and wherein the organic acid is at least one selected from the group consisting of acetic acid, formic acid, and malonic acid.

2. The ink according to claim 1, wherein the ink has pH of 6 or higher but 8 or lower.

3. The ink according to claim 1, wherein the ink includes calcium ions in an amount of 50 ppm or less.

4. The ink according to claim 1, wherein the ink includes a heterocyclic aromatic compound.

5. The ink according to claim 4, wherein the heterocyclic aromatic compound is a benzotriazole compound.

6. The ink according to claim 1, wherein pKa of the organic acid is 4.5 or less.

7. A method for producing the ink according to claim 1, the method comprising
adding the organic acid to ink raw materials satisfying Expression (2) to make the ink satisfy Expression (1):

$$y \leq -403x + 3400 \qquad \text{Expression (1); and}$$

$$y > -403x + 3400 \qquad \text{Expression (2),}$$

where, in Expressions (1) and (2), x is pH where x is $4 \leq x \leq 8.5$ and y is electric conductivity (mS/cm),
wherein the ink raw materials include the water and the dye having a triazine skeleton.

8. The method for producing ink according to claim 7, wherein the ink raw materials include calcium ions in an amount of 50 ppm or less.

9. The method for producing ink according to claim 7, wherein the ink raw materials include a heterocyclic aromatic compound.

10. The method for producing ink according to claim 9, wherein the heterocyclic aromatic compound is a benzotriazole compound.

11. An inkjet system comprising:
an ink storing unit storing the ink according to claim 1; and
an inkjet head including a nozzle substrate having an ink repellent layer including a silicone resin, the inkjet head configured to discharge the ink stored in the ink storing unit.

12. The ink according to claim 1, wherein the ink includes calcium ions in an amount of 7 to 50 ppm.

* * * * *